March 24, 1964 W. T. SIEGLE 3,126,534

AUTOMATIC REGENERATION MEMORY

Filed Oct. 31, 1961 3 Sheets-Sheet 1

INVENTOR
WILLIAM T. SIEGLE

BY Roger S. Smith
ATTORNEY

United States Patent Office 3,126,534 Patented Mar. 24, 1964

3,126,534
AUTOMATIC REGENERATION MEMORY

William T. Siegle, Troy, N.Y., assignor to International Business Machines Corporation, New York, N.Y., a corporation of New York Filed Oct. 31, 1961, Ser. No. 149,042
9 Claims. (Cl. 340—174)

The present invention relates to static magnetic storage and switching systems, and is directed in particular to an improved magnetic memory system which has the property of automatic information regeneration.

Memory systems employing bistable magnetic cores are well-known in the data processing arts. Conventional core memory systems utilize the different remanence states of a bistable magnetic core, or combinations of the states of several cores, to represent stored binary values. The cores are usually arranged in matrix formation, and combinational input switching techniques are employed to control individual elements or groups of elements in the array. Information is entered into a selected core by driving it to a predetermined stable remanence state. The information is retrieved by driving the core to a reference state and examining the output induced in an output winding coupled to the core. The magnitude of this output, or its polarity, or its relationship with another output, indicates the value of the information retrieved.

The type of read-out just described is "destructive" since the core is changed from its information holding state to the reference state during the read-out process. If the information is to be retained in the memory, it must be re-written therein. The re-writing process, sometimes called "information regeneration" is accomplished by applying combinational inputs to the matrix in such a manner that the previously read-out cores are returned to the information representing states occupied prior to read-out.

It has been recognized that in systems where the same information is likely to be needed over and over again, memory systems having the property of non-destructive read-out, or automatic regeneration, are desirable. Such memory systems are known in the art. In the past, however, non-destructive memory systems have usually employed techniques for determining the state of a core without producing a change of state, as by applying a quadrature field, etc. These techniques, however, produce only small outputs and usually require specialized driving or sensing circuitry.

According to the present invention, a memory system is provided wherein interrogation is accomplished by driving the cores from their information states toward a reference state to produce substantial outputs, but wherein regeneration of the information is accomplished automatically without the need for re-writing as in normal destructive read-out systems. This invention takes advantage of a novel "relaxation" phenomenon which has been observed to exist in bodies of various bistable magnetic materials. It has been found with respect to magnetic cores of various materials, including ferrites, that upon application of certain driving fields thereto a transitory sensitized state is produced during which the switching threshold, i.e. the value of field strength which must be exceeded to produce irreversible flux switching in the core, is markedly reduced. This sensitized state exists for an appreciable time after termination of the sensitizing pulse. During the existence of the sensitized state, a driving field below the level normally required to irreversibly switch flux in the core is capable of doing so. Upon termination of the sensitized state, the threshold of the core increases and a field lower than the normal switching level will not disturb the core.

It is known that a bistable magnetic core has two different switching thresholds. One is the static or D.C. threshold below which a field will not produce an irreversible flux change regardless of its duration. The second is a function of both the amplitude and duration of the applied field. It has been found that a driving field several times greater than the D.C. switching threshold of a core does not produce appreciable irreversible flux switching if its duration is below some critical time. Thus, for driving fields above the static threshold, a second, dynamic, threshold exists which is a function of both field magnitude and duration.

The sensitizing pulse must be above the static or D.C. switching threshold of the core to produce the sensitized state just described, and is preferably near or above the dynamic threshold.

When fields above the dynamic threshold are employed to produce the sensitized state, some irreversible flux switching takes place in addition to the sensitization and the element is left in a partially switched state after the sensitized condition disappears. In this situation the static switching threshold of the core does not return to its initial value but assumes a value representing the static threshold of a minor loop on which the magnetic state of the core resides. It is known that a magnetic core exhibits a family of hysteresis loops which include a major or limiting loop observed when the core is alternately set and reset to its limiting remanent states and a plurality of minor loops observed when the core is set and reset to remanent states less than the limiting states. The minor loops exhibit static switching thresholds lower than the static threshold of the major loop. A core which is fully switched, i.e. residing at remanence on the major loop, may therefore be expected to exhibit a higher switching threshold than it exhibits when in a partially switched state, i.e. residing at remanence on one of its minor loops. The relaxation effect just described should not be confused with this variation in threshold between hysteresis loops. The reduction in switching threshold observed when a core is placed in a partially switched state is a permanent reduction and does not disappear regardless of how long the core remains in the partially switched state. The threshold variation produced by the relaxation effect temporarily reduces the threshold of the material well below the static threshold value to which the core returns upon termination of the sensitized condition. In the case where the core is partially switched during sensitization, the threshold which the core exhibits during sensitization is well below the static threshold of the loop upon which the core resided before sensitization and also below the static threshold of the loop upon which it resides after the sensitized condition disappears.

An important characteristic of the relaxation phenomenon is that a core which is driven into saturation by a sensitizing pulse does not exhibit nearly as great a reduction in switching threshold as is produced if the switching is terminated before the core reaches saturation. This characteristic is employed in the present invention as a means to cause a core to "remember" its former state when switched toward a reference state by an interrogating pulse.

According to the present invention, a magnetic storage core is interrogated by a high amplitude, short duration field which switches it toward a reference state which is one of the limiting remanence states. The interrogation field is adjusted so that if the core is at an information representing state remote from the reference state it is not fully switched, but if it is at an information state near the reference state, it is driven into saturation. The interrogation field sensitizes the core. Following the interrogation a low amplitude regeneration field is applied to the core in a direction opposite that of the interrogation field. This regeneration field is below the static switching threshold of the core. If the core was not saturated during interrogation, it will be deeply sensitized and will be switched back to its initial state by the regeneration field. If it was saturated during interrogation, it will be only lightly sensitized and the regeneration field will, at most, switch the core only a very short distance.

It will be apparent that this operation provides automatic regeneration of the information previously stored in the core without the necessity of re-writing the information in the normal manner. A non-destructive memory system employing the present invention enjoys substantial advantages over non-destructive read-out systems of the type mentioned earlier herein in that large output signals and, hence, large signal-to-noise ratios are obtainable. Additional advantages are realized in that the regeneration field may be very small so as to avoid disturbance of unselected cores if the memory is in the form of a matrix.

It is an object of this invention to provide an improved system for switching a bistable magnetic element with combinationally applied inputs.

More specifically it is an object of this invention to provide a novel combinational input switching system wherein the relaxation phenomenon is employed to permit substantial flux switching by an input field lower than the static switching threshold of the element involved.

It is also an object of this invention to provide an improved means and method for non-destructively interrogating a bistable magnetic core.

A further object of the invention is to provide an improved non-destructive read-out, or automatic information regeneration memory system.

The foregoing and other objects, features and advantages of the invention will be apparent from the following more particular description of preferred embodiments of the invention, as illustrated in the accompanying drawings.

Figure 4A:
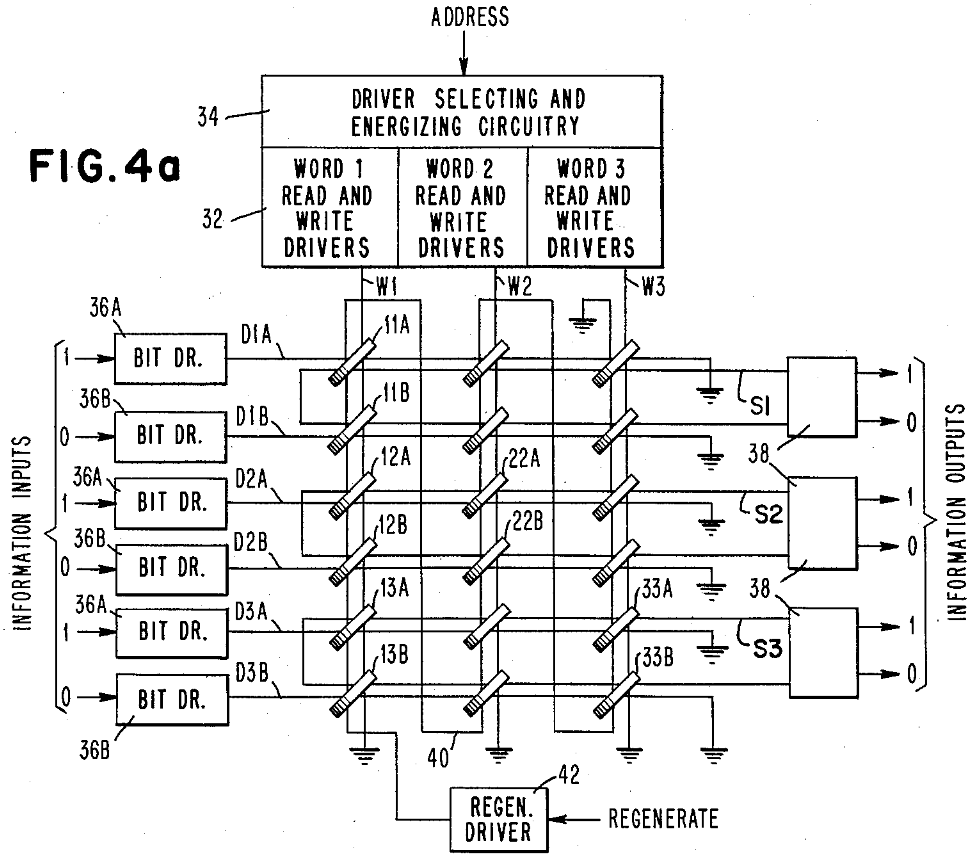
Figure 4B:
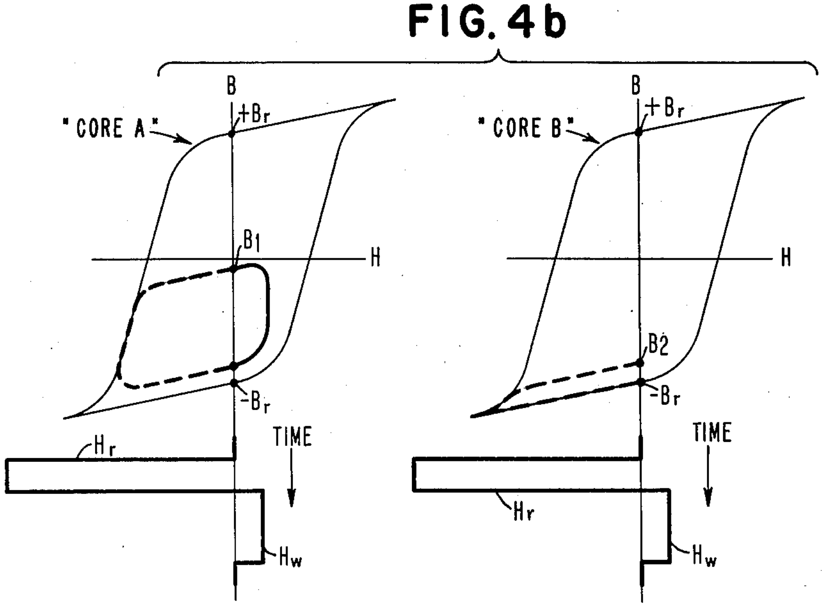
Figure 5A:
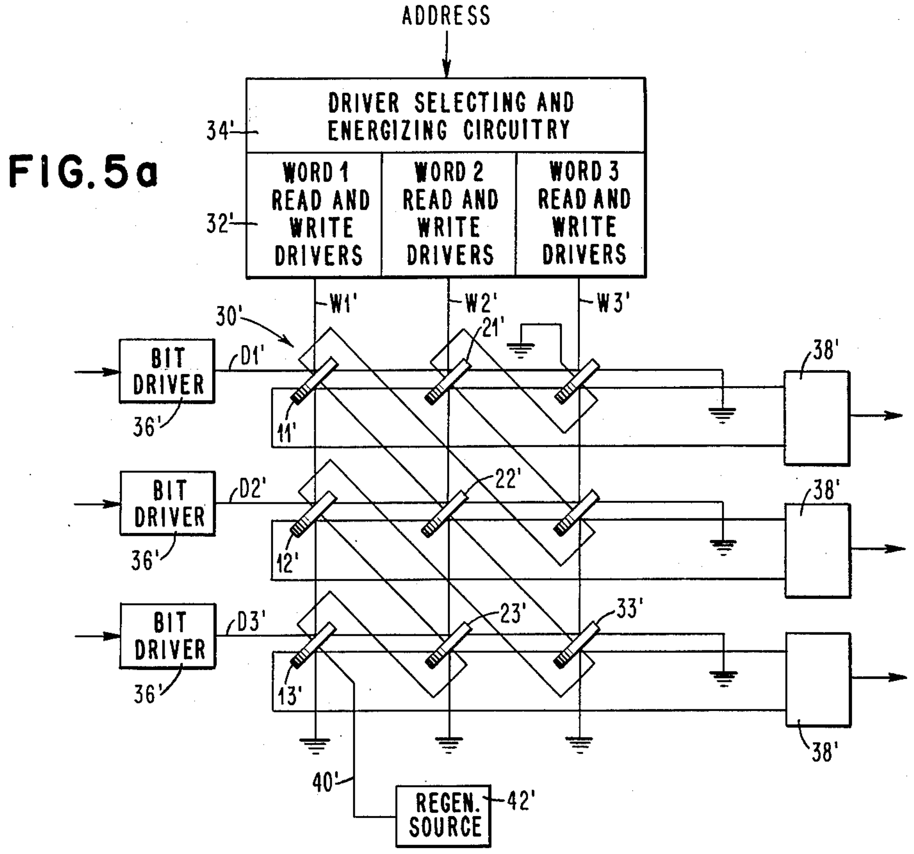
Figure 5B:
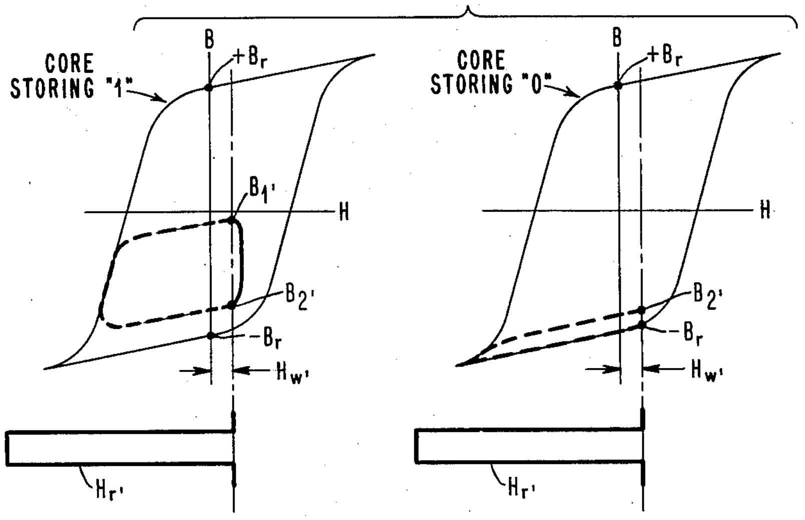

FIG. 4*a* is a schematic illustration of a non-destructive read-out memory system embodying the present invention;

FIG. 4*b* is a hysteresis diagram illustrating the operation of the system of FIG. 4*a*;

FIG. 5*a* is a schematic illustration of another non-destructive read-out memory system embodying the invention; and FIG. 5*b* is a hysteresis diagram illustrating the operation of FIG. 5*a*.

As briefly mentioned earlier herein, the present invention takes advantage of a phenomenon termed a "relaxation effect." This effect has been observed to exist in various magnetic materials which exhibit appreciable remanence. The relaxation effect is observed to be quite pronounced in ferrite materials having low values of coercive force. Ferrites of the iron-manganese-zinc system are exemplary. The relaxation effect is manifested as a sharp reduction in the switching threshold of the materials for a time following application of certain driving fields thereto. Before passing to a detailed description of this effect and the applications thereof, definitions of the various terms involved will be given.

The term "bistable magnetic element" or "bistable magnetic core" as employed herein refers to a body of magnetic material having substantial magnetic remanence, and adapted to be inductively coupled to suitable magnetomotive force supplying windings.

The term "switching threshold" refers to that value of magnetomotive force which must be exceeded before an appreciable change in remanent magnetism is produced.

This is sometimes referred to in terms of field intensity and sometimes in terms of current intensity. It may be referred to hereinafter in either of these terms.

Two different thresholds are important to the present invention. The first of these is the "static" or "D.C." switching threshold which is defined as that value of magnetomotive force below which no appreciable irreversible switching occurs regardless of the time duration of the applied field. The other threshold is a function of the time duration of the applied field as well as its amplitude and is termed the "dynamic" threshold of the material. This property, which is known in the art, has been discussed earlier herein. It will be understood that while for a given magnetic element in a given state of remanence, there exists only one static threshold value, many dynamic thresholds exist, each of which is a function of the duration of the field involved.

In the following description, magnetic fields or the drive pulses which produce them will be referred to as being applied to a core in the "write" direction or the "read" direction. The "write" direction is the direction of a field which tends to switch the core toward the positive limiting remanence state, $+Br$ in the diagram of FIG. 2, and the read direction is the direction of a field which tends to switch the core toward the negative limiting remanence state, $-Br$ in FIG. 2.

The relaxation effect is observed to exist in a bistable magnetic element following application of certain driving fields thereto. The effect is manifested as a transitory reduction in the switching threshold of the element, or stated somewhat differently, as a transitory sensitized condition of the element during which magnetomotive forces lower than the static threshold of the element are capable of producing appreciable irreversible flux changes. The mechanism which causes the effect is not fully understood. The sensitized condition is produced by applying to the element a magnetizing field greater than the static threshold of the element and in a direction to irreversibly switch flux in the element. This field will hereinafter be referred to as the "sensitizing" field.

Figures 1, 2:
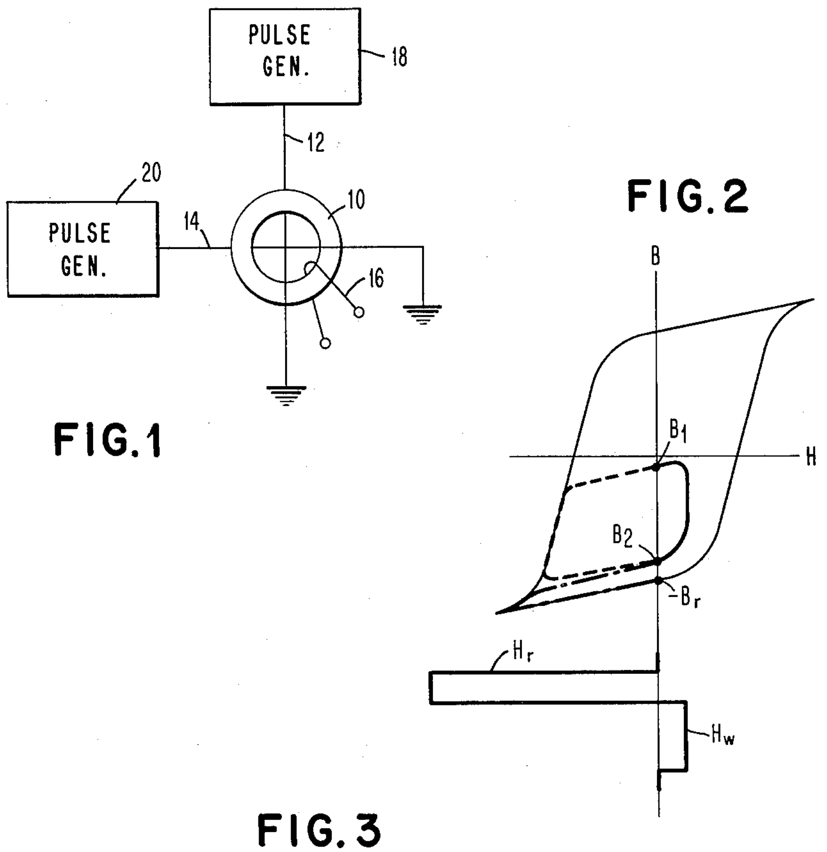
FIG. 1 is a schematic illustration of a magnetic core circuit that is operated in accordance with this invention.
FIG. 2 is a hysteresis diagram of the core of FIG. 1.

If the element is initially residing at one of its limiting remanence states, $-Br$ or $+Br$ on the hysteresis loop of FIG. 2, a sensitizing pulse applied in a direction to drive the core toward saturation in the same polarity does not produce any appreciable threshold reduction, since no irreversible switching is possible. To sensitize a core residing in either of these limiting remanence states, the pulse must be in a direction to tend to switch the core toward the opposite state. If, however, the core is initially residing in a partially switched state, for example, at point B1 in FIG. 2, a sensitizing pulse in either direction will produce a substantial threshold reduction.

The threshold reduction produced by sensitization occurs not only in the direction of the sensitizing pulse, but in the opposite direction as well. Thus if a sensitizing pulse is applied in the read direction to a core residing at, for example, point B1 in FIG. 2 the core will experience a relaxation of the switching threshold in the read direction and will also experience a relaxation of the switching threshold in the write direction.

The sensitizing field must be above the static threshold of the element and is preferably equal to or greater than the dynamic threshold. It has been found that the extent of sensitization of the element is in part a function of the amplitude and duration of the sensitizing field in that fields above the dynamic threshold of the element produce much deeper and more lasting sensitizations than do lesser fields.

It has been found that the extent and duration of the sensitization is in part a function of the magnetic state to which the core is driven by the sensitizing pulse. It appears that a core which is driven into saturation of either polarity by the sensitizing pulse does not experience as great a reduction in switching threshold as is produced if the switching is terminated before the core reaches saturation.

Figure 3:
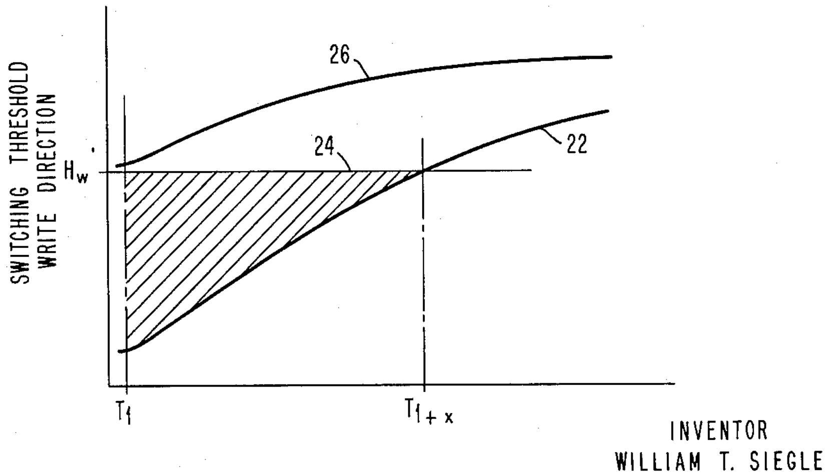
FIG. 3 is a graph illustrating the switching threshold variation experienced by the core of FIG. 1 when operated in accordance with this invention.

FIGS. 1, 2 and 3 of the drawings illustrate a bistable magnetic element adapted to be switched by combinational inputs making use of the relaxation effect, and the manner of its operation. Referring to FIG. 1, there is shown a core 10 of bistable magnetic material exhibiting the relaxation effect described above. Input windings 12 and 14 and an output winding 16 are magnetically coupled to the core. The windings 12 and 14 are connected to pulse generators 18 and 20 respectively, which are adapted, when activated, to supply currents of predetermined magnitude and duration to their associated windings.

Let it be assumed that at some time in the past the core 10 has been set to the remanence point B1 on its hysteresis loop, shown in FIG. 2. To operate the core in accordance with the teaching of this invention, a high amplitude, short duration driving pulse is applied in the read direction from generator 18. This pulse is adjusted to create a field H*r* in the core which is well above the static threshold of the minor loop upon which the core resides and enough above the dynamic threshold to switch the core along the dashed line in FIG. 2 toward negative saturation to, for example, the point B2. The magnitude and duration of the field H*r* are kept below the values necessary to drive the core into negative saturation. The graph of FIG. 3 illustrates the threshold variation produced by this drive field. The vertical axis of the graph represents the switching threshold of the core 10 in the write direction and the horizontal axis represents time. The line 22 illustrates the variation in the switching threshold of the core in response to the field H*r*. Time T1 on the graph indicates the point of termination of the field H*r*. At this time the threshold will be found to be reduced to only a minor fraction of its static value. As time passes, the threshold increases (along line 22 toward the right) until it eventually reaches a steady-state value. The steady-state value is the static threshold of the minor loop which includes remanence point B2 at which the core resides after application of field H*r*.

Following application of field H*r*, the generator 20 is activated to apply via winding 14 a low amplitude, long duration current pulse in the write direction. The amplitude of this pulse is adjusted to create a field H*w* which is lower than the static threshold of the core at point B2 but greater than the relaxed threshold at least during the period T1 to T1+*x*. The field H*w* is indicated by line 24 in FIG. 3. If this field is applied before the sensitization produced by field H*r* has terminated, it will produce a substantial irreversible flux change, switching the core back toward B1, as shown by the heavy line connecting points B1 and B2 in FIG. 2. If the magnitude and duration of H*w* are properly adjusted, the core may be switched back to the same point B1 at which it resided prior to application of the sensitizing field H*r*.

It is important to note that the field H*w* is below the static threshold of the core at points B1 and B2 so if applied without sensitization or after the sensitized period has terminated, it will not disturb the core.

It was mentioned earlier herein that a core which is driven into saturation by the sensitizing pulse does not experience the relaxation phenomenon to as great an extent as a core which is not saturated. To understand this, consider that the core 10 is initially residing at point B2 prior to sensitization. If the generator 18 is activated as before, to apply the field H*r* to the core in this state, it will be sufficient to drive the core into negative saturation. Upon termination of field H*r*, the core will be found to reside at its negative limiting remanence state —B*r*. The line 26 on the graph of FIG. 3 illustrates the threshold variation produced in this situation. At time T1 it will be found that the threshold is reduced to only a slight extent, and that it recovers its static value rather quickly. The lowest value of the threshold during sensitization is above the level of the field H*w*. Therefore, if generator 20 is activated following sensitization as before, no appreciable switching will take place, and the core will remain at or very near —B*r*.

In each of the foregoing examples the core 10 was excited with identical pulses in identical sequences. By virtue of the manner of sensitization, however, the core exhibits the characteristic that upon being read out (i.e. driven toward —B*r*) it is able to "remember" the former state and will return thereto. The read out is therefore non-destructive.

FIGS. 4*a* and 4*b* illustrate a memory system in which this characteristic is employed to provide a non-destructive or automatic regeneration memory. The memory system shown in FIG. 4*a* is a two-core-per-bit system of the type described in the copending application, Ser. No. 115,741, filed June 8, 1961, by David J. Crawford and assigned to the assignee hereof. The system includes a word organized matrix 30 of bistable magnetic cores exhibiting the relaxation effect. These cores have about the same hysteresis characteristics as the core 10; that is to say, they exhibit appreciable remanence but are not necessarily of the square hysteresis loop type. The matrix 30 consists of three columns, each comprising a different word storage register 1, 2 or 3 and three pairs of rows, each pair representing a different bit position 1, 2 or 3 common to all registers. Separate word selection windings W1, W2 and W3 couple all of the cores in each column in one sense. Separate bit or digit selecting windings D1A, D1B, D2A, D2B, D3A and D3B couple all of the cores in each row in the same sense. Sense windings S1, S2 and S3 are provided, one for each pair of rows. The sense of coupling of each winding S1–S3 with the upper row of the associated pair is opposite to the sense of coupling with the lower row.

A bit storage cell in the matrix 30 consists of the two magnetic cores common to one word winding and one bit winding. These two cores are referred to as the A core and the B core of the cell. In FIG. 4*a*, the cores are identified by the reference characters 11A, 11B . . . 33A, 33B. The first digit of the reference character identifies the word register to which the core corresponds, the second digit identifies the bit position, and the alphabetic character indicates the position within the cell.

The word selecting windings W1–W3 are coupled to read and write drivers generally indicated at 32, provided for each word storage register. While a common winding is shown in FIG. 4*a* for carrying both the read and write selection currents, it is obvious that separate read and write windings may be employed for each column, if desired. The read and write drivers 32 are controlled by driver selecting and energizing circuitry 34 which is effective to select and energize the drivers of selected word registers in response to address information supplied from some external source. The circuitry 34 includes timing means for controlling the sequence and duration of read and write pulses supplied by the driver means 32. The means 32 and 34 are not disclosed in detail herein since they are known in the art. For example, the copending application Ser. No. 115,741 mentioned above, discloses decoding, timing and driving circuitry which may be employed as the means 32 and 34.

Each of the bit windings D1A–D3B is coupled to a bit driver 36A or 36B which may be any pulse generator capable of supplying current pulses of a given polarity in response to information representing inputs supplied thereto. There are two drivers, 36A and 36B for each bit storage position. They are arranged so that an information signal representative of a binary one will activate the driver 36A, while an input representing a binary zero will activate the driver 36B. The arrows at the left of the drivers in FIG. 4*a* indicate the information input means. The actual input circuitry and the details of the drivers 36 are not disclosed herein since they are not necessary to an understanding of the invention. Bit drivers of the same type and the means for operating them are shown in the copending application, Ser. No. 115,741, mentioned above.

A binary value is entered in a storage cell of the matrix 30 by driving the two cores thereof from an initial reset state toward the opposite state in such a way that one core switches farther from the reset state than the other. The value entered depends upon which core is driven farthest. Stored information is retrieved by driving both cores of the cell back toward the reset state and differencing the output signals which they produce. The polarity of the net difference signal indicates the binary value stored. It will be apparent that the arrangement of the sense windings S1–S3 provides this differencing function between the outputs of the A and B cores of a cell, since the cores are coupled to their associated sense winding in opposition.

The sense windings S1–S3 of the matrix 30 are coupled to sense amplifiers 38 of the type capable of amplifying signals of either polarity and producing outputs indicative of the polarity of the input signals. The amplifiers 38 are connected to a data register (not shown) in which data read from the memory matrix 30 is stored pending submission to a utilization device.

The memory system of FIG. 4*a* is also provided with a regenerating winding 40 which is coupled serially to all of the cores in the same sense. The winding 40 is connected to a regeneration driver 42.

Information is entered into a selected word storage register of the matrix 30 in any known manner, for example, by applying a write selection pulse to a selected one of the write selection windings W1–W3 and by applying information representing pulses to the several bit entry windings D1A–D3B in such a way that the cores in the several cells of the selected register are set in their various information representing combinations. Application Ser. No. 115,741 describes in detail how this is accomplished employing coincident-current techniques. Application Ser. No. 149,050 filed October 31, 1961 by N. G. Vogl, Jr. and J. A. Parisi, and assigned to the assignee hereof, describes how this may be accomplished by taking advantage of the relaxation effect described above.

The operation of the memory system of FIG. 4*a* in the non-destructive or automatic regeneration mode will be understood from the following example of a typical non-destructive read-out cycle. For the purposes of the example, assume that word register 1 contains the binary word "101." Each of the three bits of this word is stored as a combination of states of the A and B cores of a different cell in the leftmost column of matrix 30. FIG. 4*b* illustrates the hysteresis loops of the cores of a typical cell, for example, cell 11A, 11B. The remanence points B1 and B2 represent the respective states of these two cores when storing a binary one. The cores 13A and 13B will be in similar states. The states of cores 12A and 12B will be reversed since they store a binary zero.

To interrogate word register 1, its address is applied to circuitry 34 to activate the read driver 32 associated with word selection winding W1. This driver supplies a high amplitude, short duration current pulse in winding W1 in the read direction to create in all the cores coupled thereto an interrogating field H*r*, shown in FIG. 4*b*. The output of the read driver is adjusted so that the field H*r* is above the dynamic thresholds of cores residing at points B1 and B2, so that some irreversible switching in the read direction occurs in all cores of word register 1. The field H*r* is made sufficient to drive cores residing at point B2 into negative saturation so that they come to rest at $-$B*r* upon termination of the field. The duration of field H*r* is limited, however, so that cores at point B1 are not fully reset and come to rest at about point B2. The dashed lines in FIG. 4*b* show, symbolically, the magnetic excursions of cores 11A and 11B in response to field H*r*. The cores 12A, 12B, 13A and 13B make similar excursions.

It will be seen from FIG. 4*a* that core 11A is switched farther than core 11B and, therefore, produces a larger output signal in winding S1 than does core 11B. The net difference signal on winding S1 is, therefore, of one polarity, for example, positive, and the associated amplifier 38 supplies an output indicative of a binary one. In the second storage cell of word register 1, core 12B was at point B1 and core 12A was at point B2 prior to read-out so the net difference signal presented by winding S2 to its amplifier 38 is of negative polarity and a binary zero is indicated. The signal on winding S3 is of the same polarity as that on winding S1 since core 13A was at point B1 and core 13B was at B2, and the third amplifier 38 indicates a binary one.

Upon termination of the field H*r* the cores 11A, 12B and 13A will be deeply sensitized since they were not driven to saturation by the interrogating field. Cores 11B, 12A and 13B, on the other hand, were saturated and therefore only lightly sensitized. The line 22 on the graph of FIG. 3 represents the threshold reduction of cores 11A, 12B and 13A. Line 26 represents the threshold reduction of cores 11B, 12A and 13B. Following the field H*r*, a regeneration field H*w* (see FIG. 4*b*) is applied to all cores of the matrix 30 in the write direction via the regeneration winding 40. This field, produced by a current pulse from source 42, is restricted to a value less than the static threshold of cores at point B2 and preferably less than the static threshold of cores at point B1, so that no disturbance of the cores of the unsensitized word registers 2 and 3 is produced. Slight disturbance of cores at point B1 by the field H*w* may be tolerated since such disturbance operates to increase the flux level therein. The field H*w* is also restricted to a value very near and preferably below the relaxed threshold of the lightly sensitized cores 11B, 12A and 13B so that they are not switched appreciably thereby. These cores remain at or near $-$B*r*. They may be disturbed up to point B2 without adverse effects, however.

The field H*w* is considerably greater than the relaxed thresholds of the deeply sensitized cores 11A, 12B and 13A, at least during the period T1 to T1+*x* as shown by the shaded area in FIG. 3 and these cores are switched upwardly on their hysteresis loops as shown symbolically by the heavy line in the left hand diagram of FIG. 4*b*. The magnitude and duration of field H*w* are adjusted so that the deeply sensitized cores are returned substantially to their original information representing state B1.

It will be appreciated that the application of field H*w* indiscriminately to all of the cores of the matrix 30 has, because of the various levels of sensitization produced by the interrogating field H*r*, effected automatic regeneration of the information stored in the cells of word register 1.

It has been pointed out that the interrogating field H*r* must be restricted to prevent saturation of cores reset from point B1. When new information is to be written into a word register of the matrix, it is desirable to fully reset all of the cores of the register prior to the writing operation. In the system of FIG. 4*a* separate drivers and separate reset windings may be employed for this purpose if desired or, in the alternative, the interrogation field H*r* may be applied two or more times in rapid succession to drive all cores into negative saturation.

It will be apparent to those skilled in the art that the present invention is applicable to one-core-per-bit memory systems as well as to systems of the type shown in FIG. 4*a*. FIGS. 5*a* and 5*b* illustrate a one-core-per-bit embodiment of a non-destructive read-out system employing the invention. The memory of FIG. 5*a* is substantially the same as that shown in FIG. 4*a* with the exception that the B rows of cores and their associated bit windings and drivers have been removed. Reference characters similar to those employed in FIG. 4*a* are utilized to indicate similar elements in FIG. 5*a*, but each includes the symbol (′) to avoid confusion. Since the matrix 30′ of FIG. 5*a* employs only one core for each bit of storage, the A and B suffixes are not utilized.

In the system of FIG. 5a a binary one is stored in a selected core by driving it to the level of point B1′ on its hysteresis loop (see FIG. 5b) and a zero is stored by maintaining the core near $-Br$, for example, at the level of point B2′. Any known matrix switching technique may be employed to enter the information. For example, a binary one may be entered by coincidently energizing a word selection line W1′, W2′ or W3′ and a selected bit entry line D1′, D2′ or D3′. A zero is stored by energizing the word selecting line alone. Switching techniques employing the relaxation effect, as described in the copending application 149,050, filed October 31, 1961 may also be employed.

Information is read out by driving all of the cores of a selected word register toward $-Br$ and sensing the magnitude of the outputs produced thereby on the sense lines S1′, S2′ and S3′. The amplifiers 33′ are of the type adapted to discriminate between output amplitudes.

In the system of FIG. 5a, the regenerate winding 40′ is coupled to a source 42′ which is adapted to provide a constant D.C. current rather than a current pulse as in FIG. 4a. The D.C. current is of an amplitude sufficient to create a bias field $Hw'$ in the write direction in all cores of the matrix. This bias field is adjusted within substantially the same limits as the field $Hw$ of FIG. 4a; that is to say, it is made great enough to produce substantial switching of cores which are deeply sensitized as indicated by line 22 of FIG. 3 but small enough to leave cores lightly sensitized as indicated by line 26 unaffected. The field $Hw'$ is also kept below the static threshold of cores in the states B1′ and B2′ to permit cores switched to these levels to remain stable.

As in the system of FIG. 4a, interrogation is accomplished by supplying to a selected word winding W1′–W3′ an interrogate pulse sufficient to overcome the small bias $Hw'$ and switch the cores of the selected word register toward negative remanence $-Br$. The field $Hr'$ created by this pulse is adjusted, as before, to only partially switch cores residing at point B1′ but to fully saturate cores residing at point B2′. During the readout operation the cores storing binary ones will produce significantly larger outputs than those storing binary zeros.

As explained hereinbefore, the cores not saturated by the interrogation pulse will be sensitized deeply enough that the bias field $Hw'$ can switch them back to their initial states, whereas the saturated cores will be so lightly sensitized as to be substantially unaffected by the bias field $Hw'$.

It will be apparent that the D.C. regeneration technique just described, and the pulse regeneration technique described earlier herein produce substantially identical results, and that they may be employed interchangeably in one-core-per-bit or two-core-per-bit systems.

While the present invention has been described herein with reference to two dimensional systems it should be understood that the invention is also applicable to memory systems which store information in three dimensional arrays.

While the invention has been particularly shown and described with references to preferred embodiments thereof, it will be understood by those skilled in the art that various changes in form and details may be made therein without departing from the spirit and scope of the invention.

What is claimed is:

1. A combinational input switching circuit comprising:

(a) a bistable magnetic core having two limiting remanence states and a plurality of intermediate remanence states and having a static switching threshold associated with each said remanence state which must be exceeded by a magnetizing field before the core can be switched from the said state, said core having the characteristic that a sensitizing magnetizing field sufficient in magnitude to drive the core from an occupied remanence state produces a transitory sensitized condition which exists for a finite time after termination of the sensitizing field and during which the switching threshold is reduced to a minor fraction of the static value to which it returns upon termination of the sensitized condition;

(b) sensitizing means for applying a sensitizing field of one polarity to said core sufficient to drive it in one direction from a first remanence state to a different remanence state and to produce the transitory sensitized condition; and (c) means effective during existence of said sensitized condition for applying a magnetizing field of opposite polarity to the core of magnitude less than the static switching threshold value to which the core would return upon termination of the sensitizing field but greater than the reduced threshold, to drive the core back toward the first remanence state.

2. The invention defined in claim 1 wherein the means (c) effective during existence of said sensitized condition for applying a magnetizing force of opposite polarity to the core comprises a winding coupled to the core and a pulse source operative upon termination of said sensitizing field for applying a current pulse to said winding.

3. The invention defined in claim 1 wherein the means (c) effective during existence of said sensitized condition for applying a magnetizing field of opposite polarity to the core comprises a bias winding coupled to the core and a bias source for applying constant current to the bias winding.

4. An automatic information regeneration storage circuit comprising:

(a) a bistable magnetic core having two limiting remanence states and a plurality of intermediate remanence states, said core having a static switching threshold associated with each said remanence state which must be exceeded by a magnetic field before the core can be switched from the said state, said core having the characteristic that a sensitizing field sufficient to switch the core from one remanence state to another but which does not drive the core to one of its limiting remanence states produces a transitory sensitized condition which exists for a finite time after termination of the sensitizing field and during which a magnetizing field less than the static threshold of the core in the remanence state to which it is driven by said sensitizing force can switch the core to a new remanence state;

(b) means for establishing said core in a first remanence state remote from one of its limiting remanence states to represent first information or in a second remanence state near the said one of its limiting remanence states to represent second information;

(c) interrogating means for applying to the core a sensitizing field in a direction to drive the core toward the said one limiting remanence state, said field being in excess of the static switching thresholds associated with said first and second information representing remanence states and sufficient to drive the core from the second state to the said one limiting remanence state but insufficient to drive the core from the first state to the said one limiting state; and (d) regenerating means effective during the existence of the sensitized condition for applying to the core a regeneration field in a direction opposite the sensitizing field and of magnitude less than the static thresholds associated with said second state and said one limiting state, said regeneration field being sufficient to switch the core substantially to the first information representing state if it is in the sensitized condition.

5. The invention defined in claim 4 including (e) sensing means effective upon operation of said sensitizing means to indicate whether the core is switched from said first or second state.

6. The invention defined in claim 4 wherein the regenerating means (*d*) comprises a winding coupled to the core and a pulse source operative upon termination of the sensitizing field for applying a current pulse to said winding.

7. The invention defined in claim 4 wherein the regenerating means (*d*) comprises a bias winding coupled to the core and a bias source for applying constant current to the bias winding.

8. An automatic information regenerating storage circuit comprising:

(*a*) a pair of bistable magnetic cores each having two limiting remanence states and a plurality of intermediate remanence states and having a static switching threshold associated with each said remanence state which must be exceeded by a magnetizing field before the core can be switched from the said state, each said core having the characteristic that a sensitizing field sufficient in magnitude to drive the core from an occupied remanence state but which does not drive the core to one of its limiting remanence states produces a transitory deeply sensitized condition which exists for a finite time after termination of the sensitizing field and during which the switching threshold of the core is reduced to a minor fraction of the value to which it returns upon termination of the deeply sensitized condition, each said core also having the characteristic that a sensitizing field sufficient in magnitude to switch the core from one remanence state to another and which does drive the core to one of its limiting remanence states produces a transitory lightly sensitized condition during which the threshold of the core is only slightly reduced below the value to which it returns upon termination of the lightly sensitized condition;

(*b*) means for establishing one of the cores of said pair in a first remanence state remote from one of its limiting states and for establishing the other core of said pair in a second remanence state near the said one of its said limiting remanence states;

(*c*) interrogating means for applying to both said cores a sensitizing field in a direction to drive the cores toward the said one limiting remanence state, said field being sufficient to drive the second core from the second state to the said one limiting state but insufficient to drive the first core from the first state to the said one limiting state; and (*d*) regenerating means effective upon termination of said sensitizing field for applying to both said cores a regeneration field in a direction opposite the sensitizing field and of a magnitude less than the reduced threshold value of the core in the lightly sensitized condition but greater than the reduced threshold value of the core in the deeply sensitized condition, said regeneration field being sufficient to switch the first core substantially to the first remanence state during the existence of the deeply sensitized condition.

9. An automatic regeneration memory comprising:

(*a*) a plurality of bistable magnetic cores arranged in a plurality of word groups, each said core having two limiting remanence states and a plurality of intermediate remanence states and having a static switching threshold associated with each said remanence state which must be exceeded by a magnetizing field before the core can be switched from the said state, each said core having the characteristic that a sensitizing field sufficient in magnitude to drive the core from an occupied remanence state but which does not drive the core to one of its limiting remanence states produces a transitory deeply sensitized condition which exists for a finite time after termination of the sensitizing field and during which the switching threshold of the core is reduced to a minor fraction of the value to which it returns upon termination of the deeply sensitized condition, each said core also having the characteristic that a sensitizing field sufficient in magnitude to switch the core from one remanence state to another and which does drive the core to one of its limiting remanence states produces a transitory lightly sensitized condition during which the threshold of the core is only slightly reduced below the value to which it returns upon termination of the lightly sensitized condition;

(*b*) means for selectively establishing each core of a selected word group in a first remanence state remote from one of its limiting remanence states to represent first information or in a second remanence state near the said one of its limiting remanence states to represent second information;

(*c*) separate interrogation winding means coupled to all of the cores of each word group;

(*d*) interrogation drive means for each interrogation winding selectively operable to apply a high amplitude short duration current pulse to the associated winding sufficient to produce in each core coupled to the winding an interrogating field of one polarity sufficient in magnitude and duration to drive cores from the second remanence state to the said one limiting remanence state, but insufficient to drive cores from the first remanence state to the said one limiting remanence state;

(*e*) a regeneration winding coupled to all of the cores of each word group in the same sense; and (*f*) drive means coupled to said regeneration winding and operable at least during a period following an operation of an interrogation drive means to apply current to said regeneration winding to produce in each core coupled thereto a regeneration field of polarity opposite that of the interrogation field and of magnitude less than the static threshold of cores in the second remanence state and less than the reduced threshold value of cores in the lightly sensitized condition but greater than the reduced threshold of cores in the deeply sensitized condition, whereby cores in the deeply sensitized condition are switched back to the first remanence state.

No references cited.